United States Patent [19]

Petermann et al.

[11] Patent Number: 5,020,036

[45] Date of Patent: May 28, 1991

[54] MAGNETOSTRICTIVE TRANSDUCER FOR LOGGING TOOL

[75] Inventors: Steven G. Petermann, Plano; Keith W. Katahara, Allen, both of Tex.

[73] Assignee: Atlantic Richfield Company, Los Angeles, Calif.

[21] Appl. No.: 475,607

[22] Filed: Feb. 6, 1990

[51] Int. Cl.⁵ .................. G01V 1/40; H01L 41/10; H04B 13/00

[52] U.S. Cl. .................. 367/168; 367/31; 367/75; 367/156; 181/106

[58] Field of Search ............ 367/156, 160, 168, 912, 367/75, 31; 181/106; 381/190; 73/662

[56] References Cited

U.S. PATENT DOCUMENTS

| | | | |
|---|---|---|---|
| 1,882,399 | 10/1932 | Pierce | 367/156 |
| 2,496,484 | 2/1950 | Massa | 181/106 |
| 3,174,130 | 3/1965 | Woollett | 367/168 |
| 4,160,232 | 7/1979 | Wilson et al. | 307/168 |
| 4,516,228 | 5/1985 | Zemanek | 367/75 |
| 4,754,441 | 6/1988 | Butler | 367/157 |
| 4,782,910 | 11/1988 | Sims et al. | 181/106 |
| 4,862,991 | 9/1989 | Hoyle et al. | 181/106 |
| 4,864,548 | 9/1989 | Butler | 367/156 |
| 4,869,349 | 9/1989 | Minear et al. | 81/106 |
| 4,899,844 | 2/1990 | Katahara et al. | 367/911 |

FOREIGN PATENT DOCUMENTS

| | | | |
|---|---|---|---|
| 0593169 | 2/1978 | U.S.S.R. | 181/106 |
| 0661471 | 5/1979 | U.S.S.R. | 181/106 |
| 0750412 | 7/1980 | U.S.S.R. | 367/75 |
| 2124377 | 2/1984 | United Kingdom | 367/75 |
| 2132763 | 7/1984 | United Kingdom | 367/75 |
| 2158581 | 11/1985 | United Kingdom | 367/31 |

Primary Examiner—Nelson Moskowitz
Attorney, Agent, or Firm—Michael E. Martin

[57] ABSTRACT

An acoustic wellbore logging tool transducer formed of a composite plate member having at least one plate of a magnetostrictive material which responds to a magnetic field to elongate or contract to effect displacement of said plate member within a cavity formed in a housing section of the logging tool. The logging tool cavity may be exposed to wellbore fluid in direct contact with the plate member whereby acoustic pressure pulses may be delivered directly to the wellbore fluid by the transducer element. Spaced apart electromagnets are disposed in the housing section on opposite sides of the cavity for effecting controlled displacement of the plate member to generate acoustic waves in a liquid-filled wellbore.

9 Claims, 1 Drawing Sheet

MAGNETOSTRICTIVE TRANSDUCER FOR LOGGING TOOL

BACKGROUND OF THE INVENTION

1. Field of the Invention

The present invention pertains to a logging tool transducer for transmitting acoustic waves through a borehole fluid in response to deflection of a magnetostrictive element.

2. Background

In the art of acoustic logging tools, various types of transducers have been developed for both transmitting acoustic pulses into the wellbore fluid and for receiving the reflected or transmitted pulses as modified by the characteristics of the formation being investigated. Several longstanding problems remain to be dealt with in regard to providing a transducer of the signal transmitting type which has enough mechanical displacement to provide the necessary acoustic wave energy and which does not require isolation from the wellbore fluid by containment within a clean liquid-filled cavity which is separated from the wellbore fluid by a flexible membrane or the like. The present invention is directed to a logging tool transducer which overcomes these problems as well as providing certain other advantages which will be recognized by those skilled in the art.

SUMMARY OF THE INVENTION

The present invention provides an improved logging tool transducer for transmitting acoustic signals to a wellbore fluid and which utilizes a magnetostrictive element. In accordance with one aspect of the present invention, a magnetostrictive type signal transmitting transducer is provided which is particularly adapted for a wellbore logging tool for generating pressure waves in a liquid-filled wellbore. The transducer includes a generally planar composite signal transmitting member which is at least partly formed by a magnetostrictive material. The member is responsive to the imposition thereon of a magnetic field to mechanically deflect or become displaced to generate an acoustic signal in the wellbore fluid. The displacement element is preferably disposed in a cavity formed in a housing member of the tool and which is exposed to the wellbore fluid.

In accordance with another aspect of the present invention, there is provided an acoustic signal transmitting type transducer for a wellbore logging tool which is relatively rugged and trouble-free, may be easily replaced, if need be, and has an adjustable response characteristic which permits relatively broad band frequency signals to be transmitted into the wellbore.

Those skilled in the art will recognize the abovementioned advantages and superior features of the present invention together with other aspects thereof upon reading the detailed description which follows in conjunction with the drawing.

DESCRIPTION OF A PREFERRED EMBODIMENT

Figure 1:
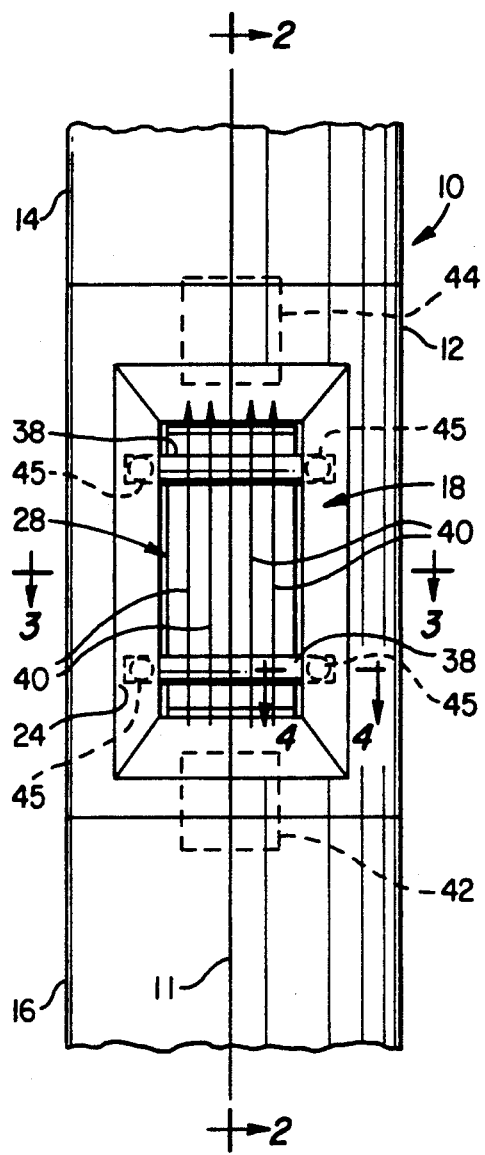
FIG. 1 is a side elevation of a portion of a wellbore logging tool including the acoustic signal transmitting transducer of the present invention.

In the description which follows, like parts are marked throughout the specification and drawing with the same reference numerals, respectively. The drawing figures are not necessarily to scale and certain elements are shown in somewhat generalized in the interest of clarity and conciseness.

Figure 2:
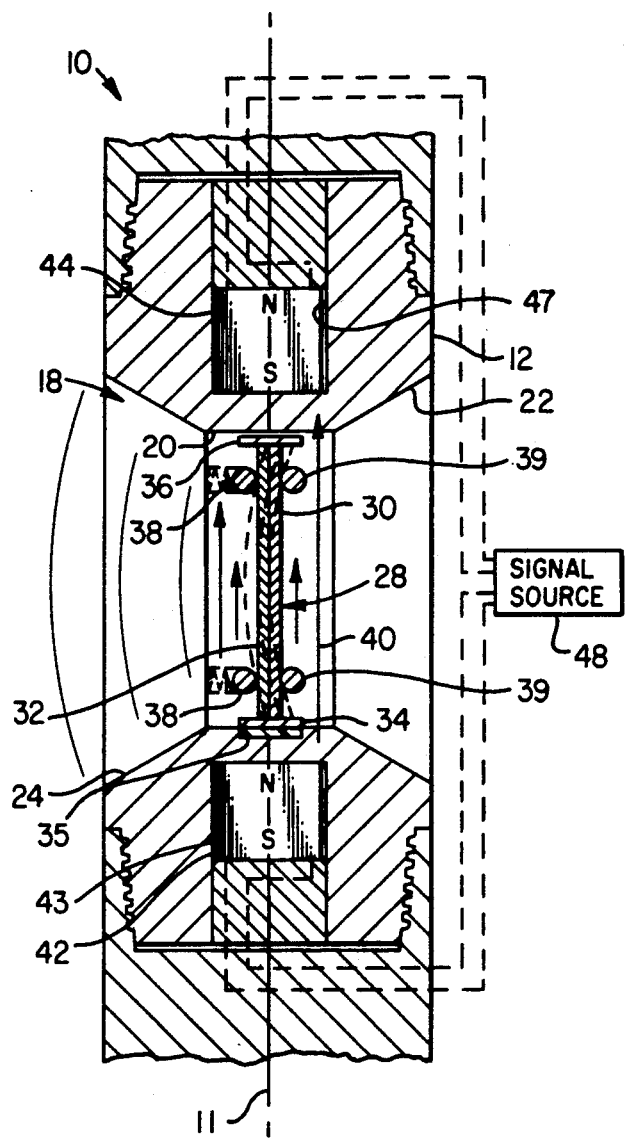
FIG. 2 is a section view taken generally along the line 2—2 of FIG. 1.
Figure 3:
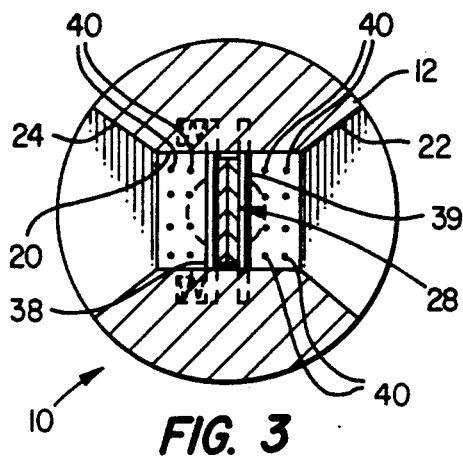
FIG. 3 is a section view taken generally along the line 3—3 of FIG. 1.

Referring to the drawing figures, and FIGS. 1 and 2, in particular, there is illustrated a portion of a wellbore logging tool 10, having an intermediate housing section 12 threadedly connected to spaced apart housing members 14 and 16. The housing section 12 includes a cavity 18 formed therein which is defined by a generally rectangular throat section 20 and opposed flared sections 22 and 24 which open to the exterior of the housing section 12. The cavity 18 is, as illustrated, exposed to any fluid in which the logging tool might be disposed. Typically, acoustic type wellbore logging tools are disposed in a liquid-filled portion of the wellbore, usually containing drilling mud, not shown, during use of the tool. Accordingly, in the tool embodiment 10, the wellbore fluid may occupy the cavity 18 although, in accordance with certain other types of transducers, the cavity 18 may be isolated from the wellbore fluid by the provision of a resilient interface such as a flexible elastomeric sleeve, not shown, disposed around the exterior of the housing section 12 and suitably clamped thereto. Such an arrangement would permit filling the cavity 18 with a suitable signal transmitting liquid such as a light mineral oil or the like to thereby isolate the cavity from the wellbore fluid. However, one advantage of the present invention is that the cavity 18 may be exposed directly to the wellbore fluid and thereby eliminate problems associated with leakage of fluid between the cavity and the wellbore, failure of the aforementioned interface and the loss of signal transmissivity sometimes caused by the isolated fluid and interface arrangement.

Figure 4:
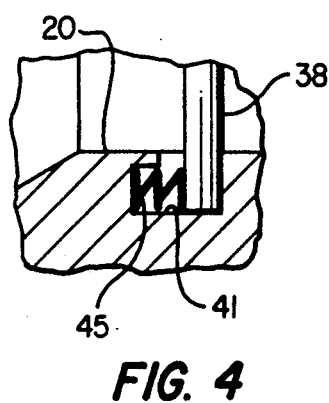
FIG. 4 is a detail section view taken along line 4—4 of FIG. 1.

The cavity throat 20 contains a unique transducer element 28 comprising a generally flat plate member formed of two relatively thin plates 30 and 32 which are bonded or otherwise secured together to form a single element. The plate 32 is formed of a ferromagnetic material which is responsive to the presence of a magnetic field to elongate generally in the direction of the longitudinal central axis 11 of the tool 10. On the other hand, the plate 30 is formed of a material which does not respond to the presence of a magnetic field. The element 28 includes opposed retaining flange portions 34 and 36, suitably secured to the plates 30 and 32 to provide for retaining the element 28 in the cavity throat 20. Pairs of spaced apart retaining pins 38 and 39 extend across the cavity throat 20 and are spaced apart sufficiently to permit free movement of the element 28 in a flexing or bending mode, as illustrated by the dashed line position of the element 28 in FIG. 2. The retaining pins 38 and 39 cooperate with the flanges 34 and 36 to prevent displacement of the element 28 from the cavity throat 20. The pins 38 are preferably retained in suitable slots 41, see FIG. 4, by way of example, and biased by springs 45 to retain the element 28, as shown, but allow for the required flexing of the element. An elastomer pad 35 may be provided to support and allow movement of the flange 34.

The transducer element 28 is subject to a magnetic field represented by magnetic flux lines 40 and which field is generated by electromagnet means 42 and 44 which are arranged spaced apart on opposite sides of the cavity throat 20 in suitable receptacles 43 and 47 formed in the housing section 12. The electromagnet means 42 and 44 may be formed by wire coils which are suitably connected to an electrical signal source 48 for generating the magnetic flux lines 40. The polarity of the electromagnet means 42 and 44 are indicated in FIG. 2. The arrangement of the wire coil-type electromagnets 42 and 44 prevents exposure of these members to the wellbore fluid. Those skilled in art will recognize that other configurations and arrangements of magnetic field generating means may be provided for inducing elongation of the plate 32 with respect to the plate 30.

The displacement of the transducer element 28 may be provided for, in accordance with the foregoing description or, alternatively, the plates 32 or 30 may be formed of a magnetostrictive material which contracts rather than elongates when exposed to a magnetic field. Still further, the transducer 28 may be made up of a plate 30 of a magnetostrictive material which contracts when subjected to magnetic flux while the plate 32 is formed of a magnetostrictive material which elongates when exposed to the same magnetic flux. Suitable materials for the plate 32 which elongates in response to exposure to a magnetic field include those made under the trademark Permalloy and suitable material for the plate member 30 could be any non-magnetic material or a magnetostrictive material which contracts when exposed to a magnetic field, such as a nickel type material. The waveform of the acoustic signal generated by displacement of the transducer 28 may be changed by changing the length, width and thickness of the plates 30 and 32 and, of course, by selectively changing the intensity of the magnetic field with respect to time. Moreover, the materials used for forming the housing section 12 and the retaining pins 38 should also preferably be non-magnetic, i.e. aluminum, bronze or certain non-magnetic steel materials for example.

The operation of the transducer 28 is believed to be readily understandable from the foregoing description. The mechanical simplicity of the transducer element 28 and its operating characteristics make it ideal for use in the harsh environment of wellbore logging tools. Although a preferred embodiment of the transducer in accordance with the present invention has been described in detail herein, those skilled in the art will recognize that various substitutions and modifications may be made without departing from the scope and spirit of the appended claims.

What is claimed is:

1. An acoustic signal transmitting transducer for a wellbore logging tool, said tool including a housing section having a generally transverse cavity formed therein having a throat portion and opposed portions opening to opposite sides of said housing section and adapted to be occupied by a liquid, said transducer comprising:
    an element defined by a composite plate member disposed in said throat portion of said cavity for displacement within said cavity to generate an acoustic wave in said liquid;
    means for generating a magnetic field passing through at least said throat portion of said cavity occupied by said element comprising at least one electromagnet means disposed in said housing section adjacent to said cavity and electrical signal generating means connected to said electromagnet means for generating a changing magnetic field to effect variable displacement of said plate member; and
    said plate member includes a part formed of a magnetostrictive material and which part is responsive to said magnetic field to change its length to effect bending of said plate member to displace liquid within said cavity for generating an acoustic signal.

2. The transducer set forth in claim 1, wherein:
    said plate member is formed of a first plate comprising a magnetostrictive material and a second plate comprising a non-magnetic material, said first and second plates being secured together to effect bending of said plate member in response to the presence of a magnetic field.

3. The transducer set forth in claim 2 wherein:
    said first plate is formed of a material which elongates said first plate in response to the presence of a magnetic field.

4. The transducer set forth in claim 2 wherein:
    said first plate is formed of a material which contracts said first plate in response to the presence of a magnetic field.

5. The transducer set forth in claim 1, wherein:
    said plate member is formed of a first plate which elongates in response to the presence of a magnetic field and a second plate which contracts in response to the presence of a magnetic field, said first and second plates being secured together to effect bending of said plate member in response to said presence of said magnetic field.

6. The transducer set forth in claim 1, including:
    retaining means on at least one of said plate member and said housing section for retaining said plate member in said cavity portion.

7. An acoustic signal transmitting transducer for a wellbore logging tool, said tool including a housing section having a generally transverse cavity formed therein having a throat portion and opposed portions opening to opposite sides of said housing section and adapted to be occupied by a liquid, said transducer comprising:
    an element defined by a composite plate member disposed in said throat portion of said cavity for displacement within said cavity to generate an acoustic wave in said liquid;
    means for generating a magnetic field passing through said throat portion of said cavity and comprising at least one electromagnet means disposed in said housing section adjacent to said cavity and electrical signal generating means connected to said electromagnet means for generating a changing magnetic field passing through said throat portion of said cavity to effect variable displacement of said plate member; and
    said plate member is formed of a first plate comprising a magnetostrictive material and a second plate comprising a nonmagnetic material, said first and second plates being secured together to effect bending of said plate member in response to the presence of a magnetic field.

8. An acoustic signal transmitting transducer for a wellbore logging tool, said tool including a housing section having a generally transverse cavity formed therein and adapted to be occupied by a liquid, said transducer comprising:

an element defined by a composite plate member disposed in a portion of said cavity for displacement within said cavity to generate an acoustic wave in said liquid;

means for generating a magnetic field passing through at least said portion of said cavity occupied by said element and comprising spaced apart electromagnets disposed in said housing section adjacent to and on opposite sides of said portion of said cavity for developing a magnetic field which passes through said portion of said cavity and generally parallel to at least one of the length and width of said plate member and electrical signal generating means connected to said electromagnets for generating a changing magnetic field to effect variable displacement of said plate member; and said plate member is formed of a first plate which elongates in response to the presence of a magnetic field and a second plate which contracts in response to the presence of a magnetic field, said first and second plates being secured together to effect bending of said plate member in response to said presence of said magnetic field.

9. An acoustic signal transmitting transducer for a wellbore logging tool including a housing section having a generally transverse cavity formed therein including a throat portion and opposed portions opening from said throat portion to opposite sides of said housing section and adapted to be occupied by a liquid, said transducer comprising:

a composite plate member disposed in said throat portion for displacement within said cavity to generate an acoustic wave in said liquid, said plate member including a part formed of a magnetostrictive material which is responsive to a magnetic field to change its length to effect bending of said plate member to displace liquid within said cavity for generating an acoustic signal;

means for generating a magnetic field passing through at least said throat portion of said cavity occupied by said plate member; and means for retaining said plate member in said cavity for bending movement to displace said liquid, said means for retaining comprising opposed pairs of spaced apart support pins for loosely journalling said plate member therebetween and for permitting said plate member to undergo bending movement in response to the imposition of said magnetic field on said throat portion of said cavity for generating an acoustic wave in said liquid.

* * * * *